(12) United States Patent
Metcalfe

(10) Patent No.: US 6,241,352 B1
(45) Date of Patent: Jun. 5, 2001

(54) LENS OVERLAYS FOR EYEWEAR

(75) Inventor: Richard T. Metcalfe, Sturbridge, MA (US)

(73) Assignee: Cabot Safety Intermediate Corporation, Southbridge, MA (US)

( * ) Notice: Subject to any disclaimer, the term of this patent is extended or adjusted under 35 U.S.C. 154(b) by 0 days.

(21) Appl. No.: 09/418,381

(22) Filed: Jul. 9, 1999

(51) Int. Cl.[7] .................................................... G02C 9/00
(52) U.S. Cl. ................................. 351/47; 351/46; 351/57
(58) Field of Search ............................... 381/47, 57, 46, 381/45, 48, 58, 41, 44

(56) References Cited

U.S. PATENT DOCUMENTS

| | | | | |
|---|---|---|---|---|
| 2,901,752 | * | 9/1959 | Granger | .................................. 381/47 |
| 5,410,763 | | 5/1995 | Bolle . | |

FOREIGN PATENT DOCUMENTS

| | | |
|---|---|---|
| 1 190 758 | 10/1959 | (FR) . |
| 2 673 299 | 8/1992 | (FR) . |
| WO98/34150 | 8/1998 | (WO) . |

* cited by examiner

*Primary Examiner*—Hung Xuan Dang
(74) *Attorney, Agent, or Firm*—Cantor Colburn LLP

(57) ABSTRACT

In general terms, the lens overlays of the present invention comprise thin, formed plastic overlays that can easily be attached to the inside or outside of the primary protective lenses by the user. In one embodiment, the lens overlay comprises a first overlay to be disposed on the left side lens and a second overlay to be disposed on the right side lens. In another embodiment, the lens overlay comprises a one piece conforming overlay lens that is attached to the front face of the primary lens by removing the frame bridge, slipping the frame temples through a left and right hole in the endpieces of the overlay and snapping the bridge back onto the frame to secure the overlay to the front face of the primary lens. In yet another embodiment directed to lens overlays for eyewear having a frame browbar with the primary lens, the formed overlay of this embodiment is secured primarily to the browbar itself.

22 Claims, 5 Drawing Sheets

LENS OVERLAYS FOR EYEWEAR

FIELD OF THE INVENTION

This invention relates generally to eyewear. More particularly, this invention relates to lens overlays for use with eyewear in safety and recreational (e.g., sports) applications.

BACKGROUND OF THE INVENTION

The use of protective eyewear is common in many safety and recreational (e.g., sports) applications. Such eyewear protects the eyes from unwanted foreign objects. Unfortunately, in some applications, the lens of the eyewear is subjected to potentially adverse conditions which reduce the life and functionality of the eyewear. For example, in painting applications, eyewear is commonly used to protect the wearer's eyes from paint droplets and the like. As is known, during the painting of a surface which extends above the head of the painter, it is necessary to continuously look upward towards the surface above in order to paint this surface. Even if the painter is careful, it is likely that some paint may drip from the ceiling or run off the tip of a brush during the upward movement of the brush toward the surface resulting in the paint falling toward the painter's head and eyes.

Because of the position of the painter's head and more particularly the eyes during the this motion, the eyes are exposed to falling paint droplets. While eyewear greatly increases the chance that the eyes of the painter will be protected from the falling paint droplets, the paint droplets will instead make contact with and soil the lens of the eyewear.

By being exposed to foreign matter, such as paint droplets, the life and functionality of the lens is reduced and in some instances may be permanently damaged. In another example, if the eyewear is used in an environment where small abrasive material is continuously being released into the air surrounding the wearer, the lens will be exposed to this same abrasive material which likely will tarnish the lens as it continuously makes contact therewith and accumulates on the lens surface.

In another aspect, the lenses of conventional eyewear commonly come in a single predetermined color. Typically, the lens will be a clear color. This creates some difficulties when the wearer wishes to move from one setting to another which varies in some way. For example, the common clear lens eyewear does not offer sunblock protection or complete comfort in high light environments. In other words, the wearing of a clear lens in a bright setting results in eye discomfort because the wearer often needs to squint to avoid the direct, bright light, e.g., sunlight.

Thus, it would be advantageous to provide conventional eyewear with added versatility and added lens protection from unwanted foreign material which may cause damage to the lens by making impact thereto.

SUMMARY OF THE INVENTION

The above-discussed and other problems and deficiencies of the prior art are overcome or alleviated by the lens overlays of the present invention. In general terms, the lens overlays comprise thin, formed plastic overlays that can easily be attached to the inside, or outside of the primary protective lenses by the user. In one embodiment, the lens overlay comprises a first overlay to be disposed on the left side lens and a second overlay to be disposed on the right side lens. In another embodiment, the lens overlay comprises a one piece conforming overlay lens that is attached to the front face of the primary lens by removing the frame bridge, slipping the frame temples through a left and right hole in the endpieces of the overlay and snapping the bridge back onto the frame to secure the overlays to the front face of the primary lens. In yet another embodiment directed to lens overlays for eyewear having a frame browbar with the primary lens, the formed overlay of this embodiment is secured primarily to the browbar itself.

The lens overlay of the present invention permits conventional protective eyewear to be multifunctional and have additional uses beyond the normal protective features of the protective eyewear. Furthermore, the lens overlays of the present invention are especially well suited for use with eyewear frames that have a severe lens curvature or lenses with integral sideshields that wrap in a different plane than the main lens. Some of the multifunctional uses in accordance with the present invention are various shades of sunglass lenses, polarized vision, yellow shooters glasses and clear, protective disposable lenses for spray painting operations.

The above-discussed and other features and advantages of the present invention will be appreciated and understood by those of ordinary skill in the art from the following detailed description and drawings.

BRIEF DESCRIPTION OF THE DRAWINGS

Referring now to the FIGURES, wherein like elements are numbered alike in the several FIGURES.

DESCRIPTION OF THE PREFERRED EMBODIMENT

Figure 1:
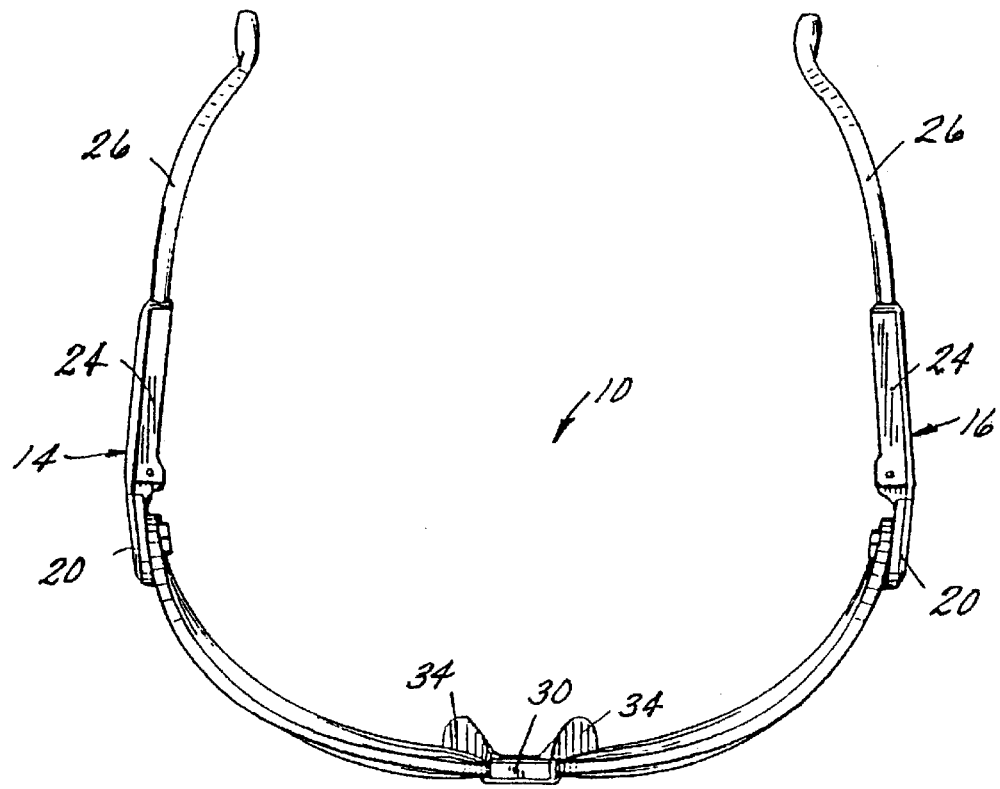
FIG. 1 is a top plan view of conventional eyewear of a first embodiment.
Figure 2:
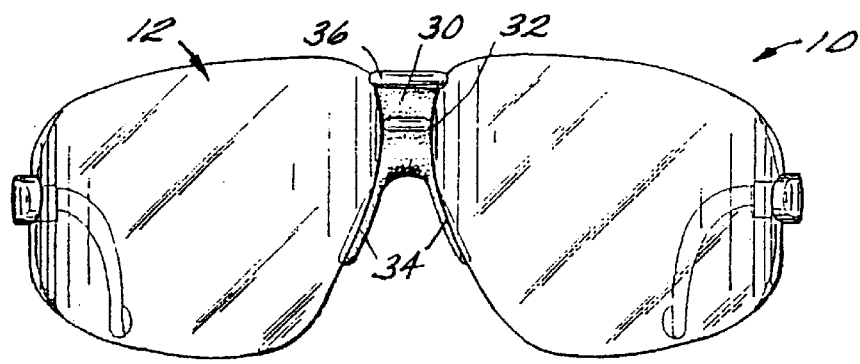
FIG. 2 is a front perspective view of the eyewear of FIG. 1.
Figure 3:
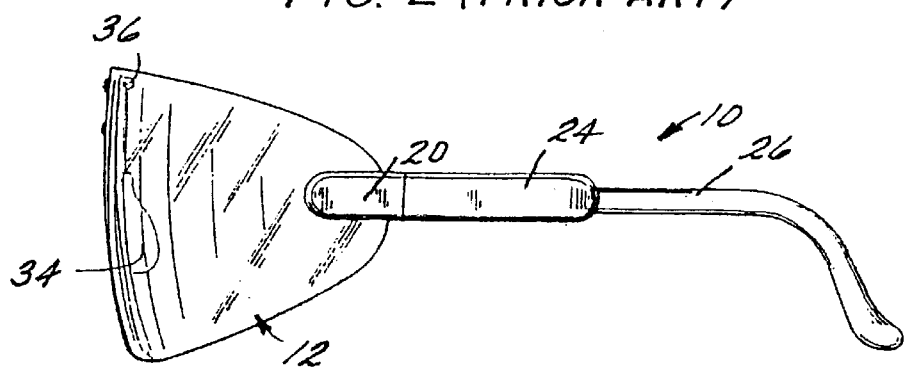
FIG. 3 is a side view of the eyewear of FIG. 1.

Referring now to FIGS. 1–3. Conventional eyewear of a first embodiment is generally shown at 10. Eyewear 10 comprises a suitable optical quality lens 12 and two adjustable temple assemblies 14 and 16. Lens 12 is a conventional lens and is preferably a molded one-piece construction. Lens 12 may be a prescription lens but will preferably be a plano lens. Lens 12 is typically clear and when used for safety or recreational use, will be made from a suitably strong, impact resistant polymer such as polycarbonate. Lens 12 may have any suitable geometric shape such as cylindrical, spherical, toric or an aspheric shape such as parabolic or elliptical, although preferably, lens 12 is spherical. At distal ends of lens 12 a mounting hole (not shown) is formed in lens 12 to permit adjustable temple assemblies 14, 16 to be secured to lens 12 in a manner which will be described hereinafter in greater detail.

While any suitable temple assembly (adjustable or non-adjustable) may be used in eyewear 10, in a preferred embodiment, the temple assemblies 14, 16 are adjustable and more preferably, adjustable temple assemblies 14, 16 are similar to the adjustable assemblies disclosed in U.S. patent application Ser. No. 08/770,920 filed Dec. 20, 1996 entitled "Flexible Temple Endpiece" which is assigned to the assignee hereof, all of the contents of which are incorporated herein by reference. Of course, as mentioned, any other suitable temple or temple assembly may be substituted for the preferred temple embodiment discussed herein.

As best shown in FIGS. 1 and 3, adjustable temple assemblies 14, 16 have an end piece 20 which has a circular neck (not shown) and an oblong fastening head 22 extending from the circular neck. Temple assemblies 14, 16 further include a temple length adjustment housing 24 which is attached to end piece 20 in a hinged manner. Temple tips 26 are movably mounted to temple length adjustment housing 24 which allows the user to adjust the overall length of temple assemblies 14, 16.

Eyewear 10 has a bridge piece 30 which is mounted to a bridge section 32 centrally located in lens 12. Bridge piece 30 is preferably a unitary piece formed of a resilient material and is removably attached to lens 12 in a snap fit manner. Bridge piece 30 has a shoulder formed therein which receives a complementarity shaped arcuate curved portion of bridge section 32 of lens 12 to secure bridge piece 30 to lens 12. A pair of nose pads 34 are formed at a bottommost portion of bridge piece 30 and a resilient bridge locking tab 36 engages and is secured to a generally planar surface of bridge section 32. Bridge piece 30 may be easily removed from lens 12 by applying pressure on nose pads 34 so that they converge toward one another. At the same time, bridge locking tab 36 is pulled away from lens 12 to disengage bridge locking tab 36 from lens 12 and thereby free bridge piece 30 from lens 12.

Attachment between lens 12 and adjustable temple assemblies 14, 16 will now be described. End piece 20 is positioned in relation to lens 12 so that oblong fastening head 22 is received within the similarly shaped mounting hole formed at distal ends of lens 12. End piece 20 is then rotated so that oblong fastening head 22 likewise rotates and end portions of end piece 20 extend over an inside surface of lens 12 to secure end piece 20 to lens 12. After temple assemblies 14, 16 are securely inserted and locked within the mounting holes of lens 12, the temple assemblies 14, 16 are located in the position illustrated in FIG. 4.

Figure 4:
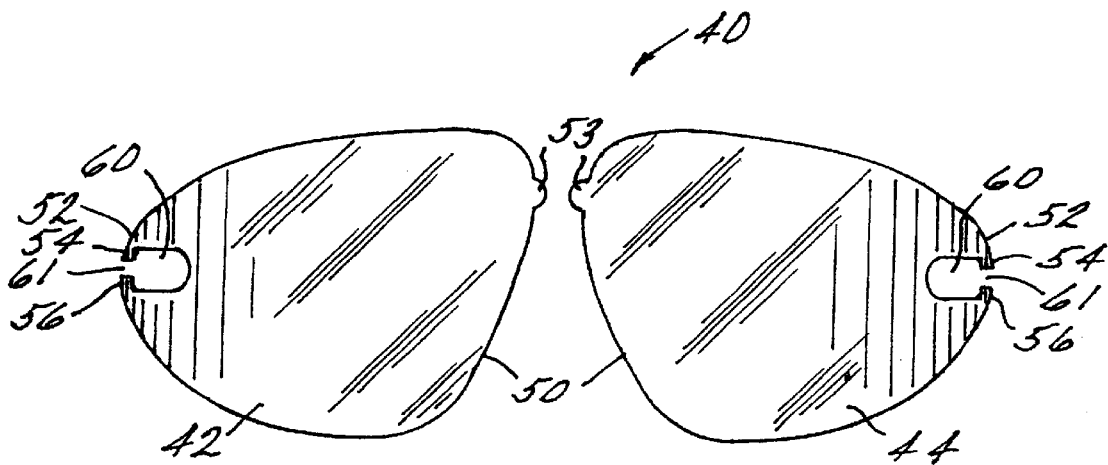
FIG. 4 is a front elevation view of a lens overlay of a first embodiment for use with the eyewear of FIGS. 1–3 in accordance with the present invention.

FIG. 4 illustrates a lens overlay of a first embodiment of the present invention and is generally indicated at 40. Lens overlay 40 actually comprises a pair of overlays, namely a first lens overlay 42 and a second lens overlay 44, which are mirror images of one another. Referring now to FIGS. 2 and 4, first lens overlay 42 is intended to be inserted on an inside or outside surface of a portion of lens 12 which is to the left of bridge piece 30 ("left lens portion"). Second lens overlay 44 is intended to be inserted on an inside or outside surface of a portion of lens 12 which is to the right of bridge piece 30 ("right lens portion"). First and second lens overlays 42, 44 are formed so that the shape thereof conforms to the shape of primary lens 12 of eyewear 10 to which lens overlays 42, 44 are to be applied. First and second lens overlays 42, 44 comprise thin, formed plastic overlays that can easily be attached to the inside or outside surface of primary lens 12. In one exemplary embodiment, lens overlays 42, 44 have a thickness in the range from about 0.006 inches to about 0.03 inches; however, it is within the scope of the present invention that first and second lens overlays 42, 44 may have thicknesses outside of this range. First and second lens overlays 42, 44 are formed of suitable plastic materials and in an exemplary embodiment are formed of thermoplastic materials, and more preferably are formed of materials selected from the group consisting of polycarbonate, cellulosics, polyesters, and the like.

Referring to FIGS. 2 and 4, each of first and second lens overlays 42, 44 has a first end 50 (nasal end) which generally corresponds to the bridge section 32 of lens 12 and an opposing second end 52 (temple end) which extends away from bridge section 32 and engages end piece 20 of temple assemblies 14, 16. More specifically, first end 50 includes an integral bridge tab 53 which extends outwardly from the remaining body of lens overlay 42, 44. Second end 52 comprises a split portion having an opening 60 with first and second tabs 54 and 56 extending therefrom to form a neck 61 extending between first and second tabs 54 and 56. The neck 61 has a width less than a width of opening 60. Opening 60 receives one end of end piece 20 when first and second lens overlays 42, 44 are disposed on the outer surface of lens 12.

To attach lens overlays 42, 44 to lens 12 and temple assemblies 14, 16, bridge tab 53 of each of lens overlays 14, 16 is inserted into an opening formed between bridge piece 30 and lens 12. In other words, bridge tab 53 of each of lens overlays 14, 16 is disposed underneath bridge piece 30 when lens overlays 42, 44 are properly disposed on and attached to the outer surface of lens 12. Second end 52 of each of lens overlays 42, 44 is attached to lens 12 by disposing end piece 20 generally within opening 60 and then disposing first and second tabs 54, 56 into an area under end piece 20. More specifically, because lens overlays 42, 44 are flexible, first and second tabs 54, 56 may be bent toward the backside of end piece 20 so that each of tabs 54, 56 frictionally rests against the backside of end piece 20 resulting in lens overlays 42, 44 being securely attached to lens 12. It being understood that lens overlays 42, 44 may be disposed on the inner surface of lens 12.

Figure 5:
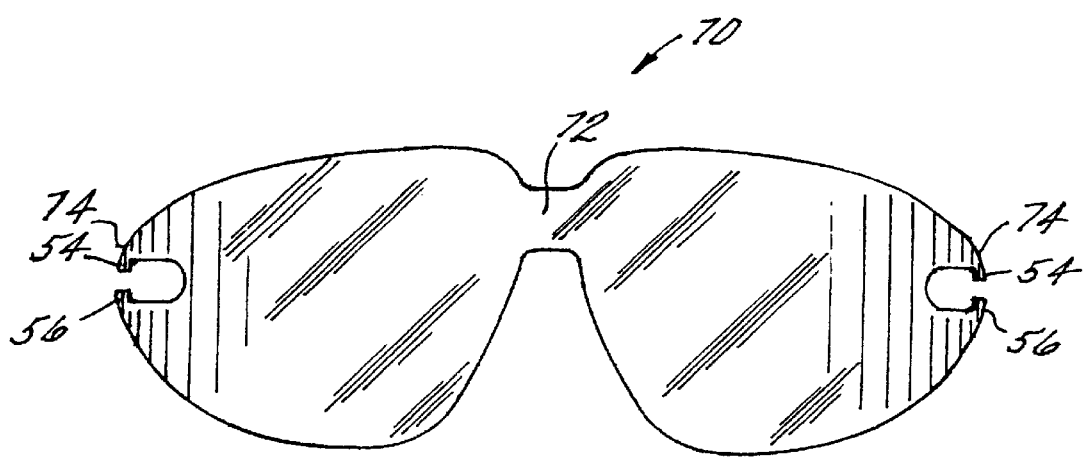
FIG. 5 is a front elevation view of a lens overlay of a second embodiment for use with the eyewear of FIGS. 1–3 in accordance with the present invention.

FIG. 5 illustrates a lens overlay of a second embodiment of the present invention and is generally indicated at 70. Referring to FIGS. 2 and 5, lens overlay 70 comprises a single piece overlay which is formed to conform to the shape of primary lens 12. In this second embodiment, because lens overlay 70 is a single piece overlay, it has a contiguous narrow bridge portion 72 which corresponds to bridge section 32 of lens 12 and connects the left and right eye sections of lens overlay 70. In other respects, lens overlay 70 is similar to lens overlays 42, 44 in that lens overlay 70 includes endpiece sides 74 which each include To attach lens overlay 70 to lens 12 and template assemblies 14, 16, bridge piece 30 is removed from lens 12 to fully expose bridge section 32 of lens 12. Endpiece sides 74 of lens overlay 70 are attached to lens 12 by disposing each end piece 20 generally within the corresponding opening 60 and then disposing first and second tabs 54, 56 into an area under each end piece 20. More specifically, because lens overlay 70 is flexible, first and second tabs 54, 56 may be bent toward the backside of each end piece 20 so that each of tabs 54, 56 frictionally rests against the backside of each end piece 20 resulting in endpiece sides 74 being securely attached to lens 12. The attachment process is completed by snapping bridge piece 30 back onto lens 12. This results in bridge portion 72 of lens overlay 70 being trapped beneath bridge piece 30. Accordingly, lens overlay 70 is thus securely and removably attached to eyewear 10. Lens overlay 70 is easily removed from lens 12 by reversing the above process.

Figure 6:
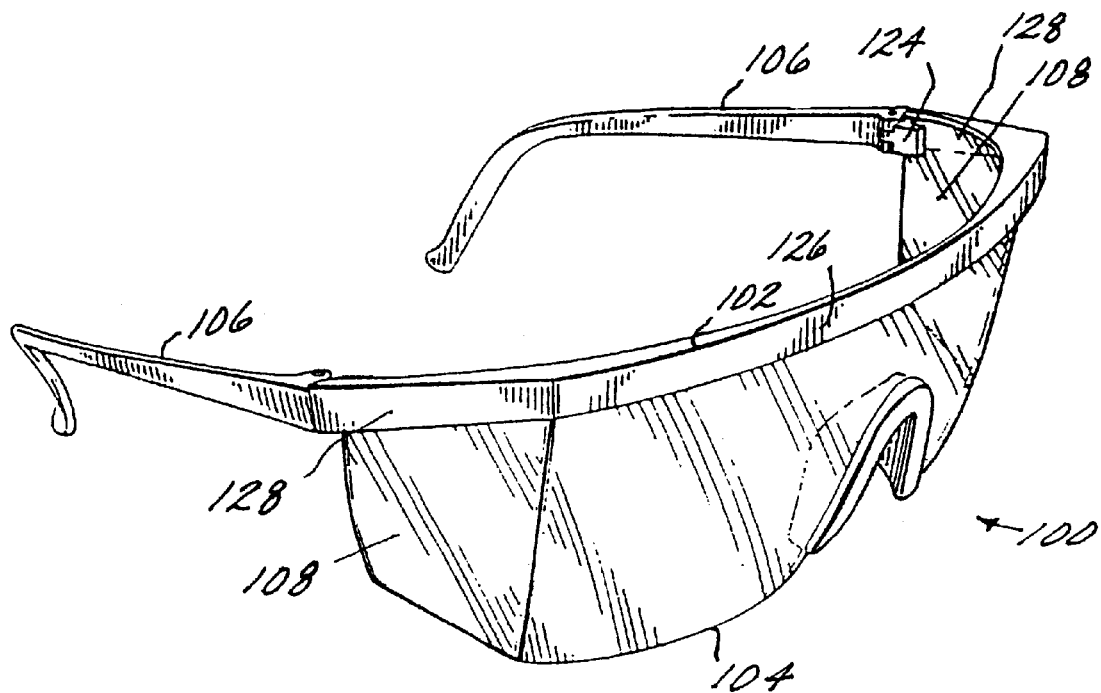
FIG. 6 is a perspective view of conventional eyewear of a second embodiment.

FIG. 6 is a perspective view of conventional eyewear of a second embodiment and is generally indicated at 100. Eyewear 100 includes a browbar frame 102 which receives 20 lens 104. Temples 106 are hingedly attached to the distal ends of browbar frame 102. Browbar frame 102 includes a pair of "L" shaped locking tabs 124 which extend from browbar frame 102 and are designed to catch and hold a detent (not shown) formed in each of sideshields 108 of lens 104. The detents formed in sideshields 108 are received in a recess defined by the "L" shaped tabs 124. Browbar frame 102 comprises a central mounting section 126 and a pair of side extensions 128 which have a curved bottom surface which seats against curved lens 104 including sideshields 108. Lens 104 is similar to lens 12 shown in FIGS. 1–3 and thus preferably comprises a suitable optical quality lens.

Figure 7:
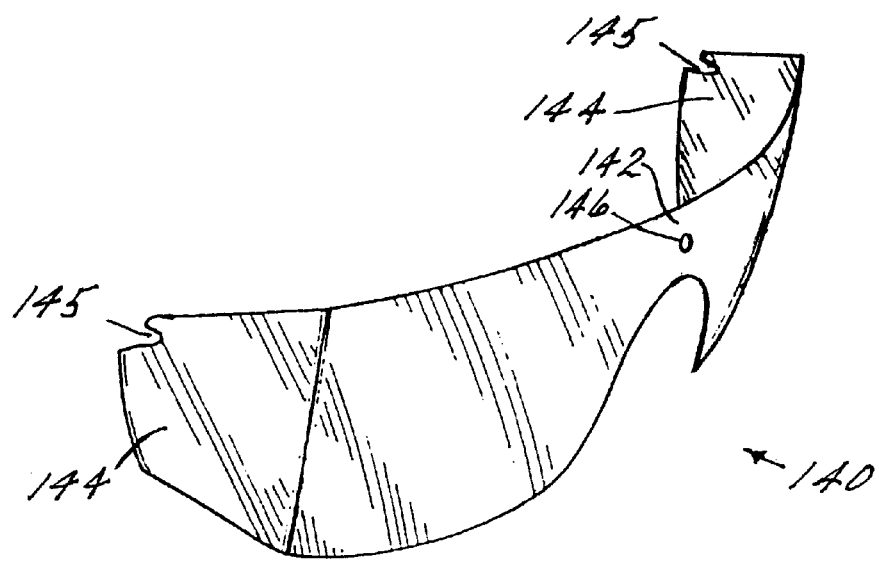
FIG. 7 is a front elevation view of a lens overlay of a third embodiment for use with the eyewear of FIG. 6 in accordance with the present invention.

Referring to FIGS. 6 and 7. FIG. 7 illustrates a second embodiment of the lens overlay according to the present invention which is shown and generally indicated at 140. In this second embodiment, lens overlay 140 comprises a single piece overlay, it has a bridge portion 142 which corresponds to the bridge section of lens 104 and connects the left and right eye sections of lens overlay 140. In addition, lens overlay 140 has a pair of integral sideshields 144 which are intended to be disposed on sideshields 108. Integral sideshields 144 each have a detent 145 which is similarly shaped and aligned with the detent formed in lens 104 when the two are disposed on one another. Lens overlay 140 includes a hole 146 which is located in bridge portion 142 and axially aligns with a hole (not shown) of lens 104 when lens overlay 140 is attached to lens 104. It being understood that the hole formed in lens 104 matches hole 146 formed in lens overlay 140. Preferably, hole 146 matches hole 110 of lens 104 so that dimple 112 of browbar frame 102 engages both holes 146 and 110. It being understood that it is within the scope of the present invention that lens overlay 140 may be disposed on either the inside or outside of primary lens 104.

To attach lens overlay 140 to lens 104 and template assemblies 106, lens overlay 140 is positioned either on the inside or outside of primary lens 104. For purpose of illustration, lens overlay 140 will be described as being attached to the outside of primary lens 104; however, it is understood that lens overlay 140 can equally be attached to the inside of primary lens 104. Lens overlay 140 is initially placed on the outside of primary lens 104 so that integral sideshields 144 are disposed on sideshields 108 and holes 146 and 110 are axially aligned. Lens 104 and lens overlay 140 are then moved towards the browbar frame 102 and lens 104 and lens overlay 140 are positioned in the "L" shaped tabs 124 to secure integral sideshields 144 and sideshields 108 within the "L" shaped tabs 124. More specifically, the detents of lens 104 and detents 145 of lens overlay 140 are received in "L" shaped tabs 124 to secure sideshields 108 and integral sideshields 144 to browbar frame 102. At the same time, lens 104 and lens overlay 140 are manipulated so that dimple 112 engages holes 146 and 110 and secures both lens 104 and lens overlay 140 to browbar frame 102. When lens overlay 140 is disposed on the inside surface of lens 104, detents 145 are used to secure integral sideshields 144 and dimple 112 engages hole 146. The length of dimple 112 is extended when lens overlay 140 is disposed on the inside surface of lens 104 so that dimple 112 passes through hole 110 formed in lens 104 and through hole 146 to secure lens overlay 140 to lens 104.

Figure 8:
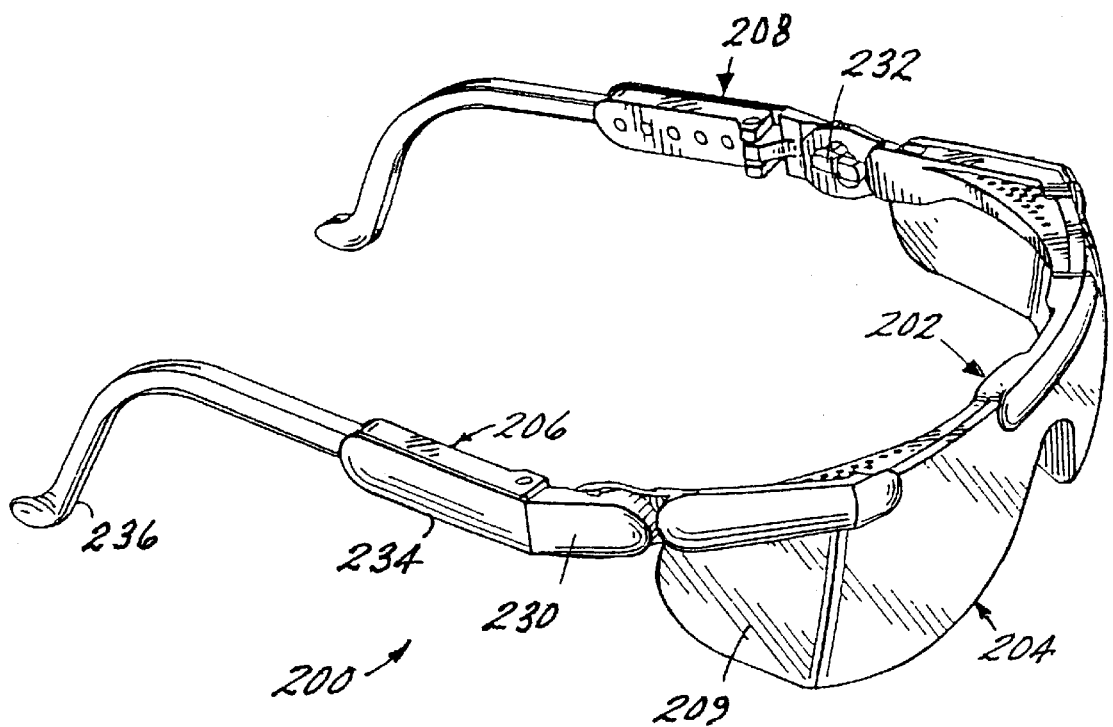
FIG. 8 is a perspective view of conventional eyewear of a third embodiment.
Figure 9:
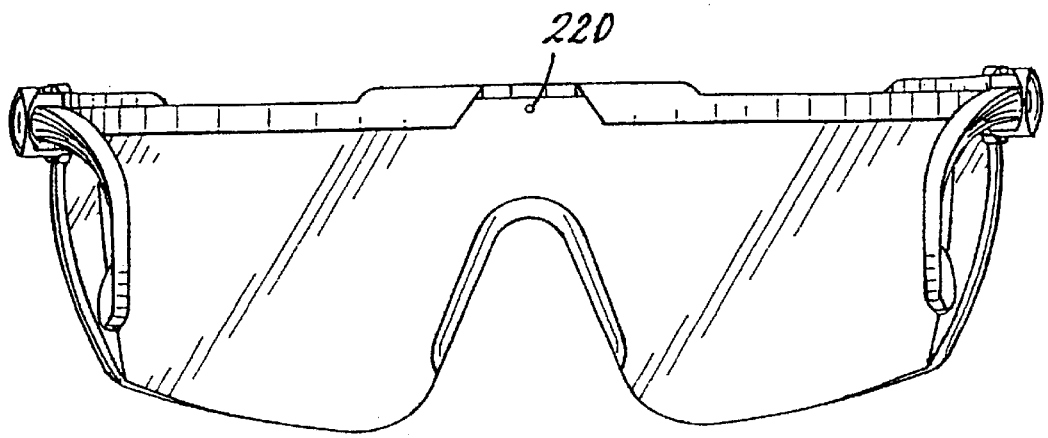
FIG. 9 is a rear view of the eyewear of FIG. 8.
Figure 10:
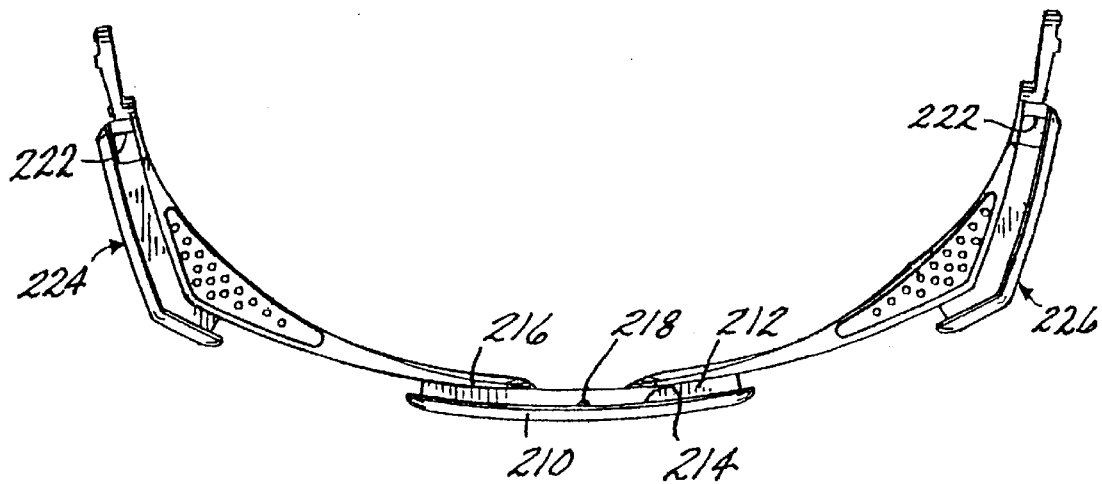
FIG. 10 is a bottom view of the ventilated browbar frame of the eyewear of FIG. 8.

Turning now to FIGS. 8–10. FIG. 8 is a perspective view of conventional eyewear of a third embodiment and is generally indicated at 200. Eyewear 200 comprises a ventilated browbar frame 202, a suitable optical quality lens 204, and two pivotal, adjustable temple assemblies 206 and 208. Lens 204 also includes a pair of sideshields 209. Adjustable temple assemblies 206 and 208 have an end piece 230 which has a circular neck and an oblong fastening head 232 extending from the circular neck. Adjustable temple assemblies 206 and 208 further include a temple length adjustment housing 234 which is attached to end piece 230 in a hinged manner. Temple tips 236 are movably mounted to temple length adjustment housing 234 which allows the user to adjust the overall length of temple assemblies 206 and 208.

The ventilated browbar frame 202 is preferably of a molded one-piece construction and is disclosed in great detail in U.S. patent application Ser. No. 09/095861 filed on Jun. 11, 1998 entitled "Ventilated Browbar Frame and Eyewear" which is assigned to the assignee hereof, all of the contents of which are incorporated herein by reference.

As best shown in FIG. 10, browbar frame 202 includes a central mounting section 210 having a channel 212 which receives a portion of lens 204. Channel 212 has an outside wall 214 curved to match the outside surface of lens 204 and an inside wall 216 shaped to match the inside surface of lens 204. Preferably, there is a dimple 218 which matches and mates in a hole 220 (FIG. 9) in the lens to provide extra rigidity when the ventilated browbar frame 202 is secured to lens 204. Attachment of lens 204 to the browbar frame 202 occurs by positioning lens detents (not shown) so that they engage ridges 222 in left and right mounting sections 224 and 226. Lens 204 is then moved towards the browbar frame 202 and lens 204 is positioned in channel 212 in central mounting section 210 an in channel 212 in the left and right mounting sections 224 and 226. Lens 204 is manipulated so that dimple 218 engages hole 220 and secures lens 204 to the browbar frame 202.

In accordance with the present invention, lens overlay 140 of FIG. 7 is used with eyewear 200 of FIGS. 8–10. To attach lens overlay 140 to lens 204 and template assemblies 206 and 208, lens overlay 140 is positioned either on the inside or outside of primary lens 204. For purpose of illustration, lens overlay 140 will be described as being attached to the outside of primary lens 204; however, it is understood that lens overlay 140 can equally be attached to the inside of primary lens 204. Lens overlay 140 is initially placed on the outside of primary lens 204 so that integral sideshields 144 are disposed on sideshields 209 and holes 146 and 220 are axially aligned. The lens detents and overlay detents 145 are positioned to engage ridges 222 in left and right mounting sections 224 and 226. Lens 204 and lens overlay 140 are then moved towards the browbar frame 202 and lens 204 and lens overlay 140 are positioned in channel 212 in central mounting section 210 and in channel 212 in the left and right mounting sections 224 and 226. Lens 204 and lens overlay 140 are manipulated so that dimple 218 engages holes 146 and 260 and secures both lens 204 and lens overlay 140 to the browbar frame 202.

It will be understood that lens overlay 140, like lens overlays 40 and 70, comprise a thin, formed plastic overlay that can easily be attached to the inside or outside of primary lens 104 or 204. In an exemplary embodiment, lens overlay 140 has a thickness in the range from about 0.006 inches to about 0.03 inches and is preferably formed of a thermoplastic material.

The lens overlays of the present invention may be manufactured so that the lens overlays may be suitably shielded by manufacturing the lens overlays in varying shades of color so that the lens overlays act as a shield and transform ordinary clear eyewear into varying shades of sunglass lens overlays. In addition, the present lens overlays may be manufactured so that the lens overlay has a polarized vision property. Another advantage of the lens overlay of the present invention is that is comprises a disposable member which is easily manufactured at low cost. Because of the ease of attaching the lens overlay to the eyewear and its disposability, the lens overlay can be discarded and replaced with a new one whenever the lens overlay is soiled or damaged during any given application. In addition, if the user is changing settings where conditions likewise change, e.g., going into a high light setting, the user can easily attach a lens overlay which offers the necessary shielding characteristics (e.g., sunglass tint).

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A lens overlay for use in eyewear having a lens including a bridge section and a pair of temple assemblies extending from ends of the lens, comprising:

a flexible transparent overlay body generally in the shape of a periphery of the lens of the eyewear, the overlay body having a first end and an opposing second end and a bridge securing portion intermediate the first and second ends, the bridge securing portion of the overlay body being disposed on the bridge of the lens when the overlay body is coupled to the lens, the first and second sides each having first and second temple tabs for securing each side to the respective temple assembly of the lens.

2. The lens overlay of claim 1, wherein the bridge securing portion of the overlay body includes an opening formed therein to receive a dimple formed on a frame of the eyewear so that the lens overlay is securely attached to the lens.

3. The lens overlay of claim 1, wherein the first and second temple tabs at each of first and second ends define an opening.

4. The lens overlay of claim 3, wherein the opening receives an endpiece of the temple assembly when the lens overlay is securely attached to the lens.

5. The lens overlay of claim 3, wherein at one end of the opening, the first and second temple tabs form a neck entrance to the opening.

6. The lens overlay of claim 5, wherein the first and second temple tabs comprise "L" shaped tabs, the neck entrance extending between the first and second temple tabs.

7. The lens overlay of claim 1, wherein the overlay body has a thickness in the range from about 0.006 inches to about 0.03 inches.

8. The lens overlay of claim 1, wherein the overlay body is formed of a thermoplastic material selected from the group consisting of polycarbonate, cellulosics, and polyesters or other transparent thermoplastics.

9. The lens overlay of claim 1, wherein the overlay body is formed of a colored material to provide light protection.

10. The lens overlay of claim 1, wherein the bridge securing portion comprises a narrow strip which connects a left eye portion of the overlay body and a right eye portion of the overlay body.

11. The lens overlay of claim 1, wherein the overlay body is disposed on an outer surface of the lens.

12. The lens overlay of claim 1, wherein the overlay body is disposed on an inner surface of the lens.

13. A lens overlay for use in eyewear having a lens including a bridge section and a pair of temple assemblies extending from ends of the lens, comprising:

first and second flexible transparent overlay bodies generally in the shape of a periphery of the lens of the eyewear, each overlay body having a bridge end and an opposing temple end having first and second temple tabs for securing the temple end of the overlay body to the respective temple assembly of the lens; and a bridge tab disposed at the bridge end of each of first and second overlay bodies, the bridge tab extending outwardly from the respective overlay body, wherein the bridge tab is secured to the lens by a bridge piece of the eyewear.

14. The lens overlay of claim 13, wherein the first and second temple tabs at the temple end define an opening.

15. The lens overlay of claim 14, wherein the opening receives an endpiece of the temple assembly when the lens overlay is securely attached to the lens.

16. The lens overlay of claim 14, wherein at one end of the opening, the first and second temple tabs form a neck entrance to the opening.

17. The lens overlay of claim 16, wherein the first and second temple tabs comprise "L" shaped tabs, the neck entrance extending between the first and second temple tabs.

18. The lens overlay of claim 13, wherein the overlay body has a thickness in the range from about 0.006 inches to about 0.03 inches.

19. The lens overlay of claim 13, wherein the overlay body is formed of a thermoplastic material selected from the group consisting of polycarbonate, cellulosics, and polyesters.

20. The lens overlay of claim 13, wherein the overlay body is formed of a colored material to provide light protection.

21. The lens overlay of claim 13, wherein the overlay body is disposed on an outer surface of the lens.

22. The lens overlay of claim 13, wherein the overlay body is disposed on an inner surface of the lens.

* * * * *

UNITED STATES PATENT AND TRADEMARK OFFICE
CERTIFICATE OF CORRECTION

PATENT NO.    : 6,241,352 B1
DATED         : June 5, 2001
INVENTOR(S)   : Richard T. Metcalfe It is certified that error appears in the above-identified patent and that said Letters Patent is hereby corrected as shown below:

Column 4,
Line 56, after "include" insert therefor -- first and second tabs 54, 56. --

Column 5,
Line 11, before "lens" delete "20"

Column 6,
Line 66, after "70," delete "comprise" and insert therefor -- comprises --

Signed and Sealed this

Fourth Day of January, 2005

JON W. DUDAS
*Director of the United States Patent and Trademark Office*